United States Patent
Urano et al.

(10) Patent No.: US 12,162,448 B2
(45) Date of Patent: Dec. 10, 2024

(54) BRAKE CONTROL DEVICE

(71) Applicant: ADVICS CO., LTD., Kariya (JP)

(72) Inventors: Tatsuya Urano, Kariya (JP); Terushige Uraoka, Kariya (JP)

(73) Assignee: ADVICS CO., LTD.

( * ) Notice: Subject to any disclaimer, the term of this patent is extended or adjusted under 35 U.S.C. 154(b) by 592 days.

(21) Appl. No.: 17/612,083

(22) PCT Filed: May 21, 2020

(86) PCT No.: PCT/JP2020/020098
§ 371 (c)(1),
(2) Date: Nov. 17, 2021

(87) PCT Pub. No.: WO2020/241442
PCT Pub. Date: Dec. 3, 2020

(65) Prior Publication Data
US 2022/0212646 A1    Jul. 7, 2022

(30) Foreign Application Priority Data
May 24, 2019  (JP) ................. 2019-098065

(51) Int. Cl.
*B60T 13/74* (2006.01)
*B60T 7/12* (2006.01)
(Continued)

(52) U.S. Cl.
CPC .............. *B60T 13/741* (2013.01); *B60T 7/12* (2013.01); *B60T 7/042* (2013.01); *B60T 13/662* (2013.01);
(Continued)

(58) Field of Classification Search
CPC .................................................. B60T 2201/06
See application file for complete search history.

(56) References Cited

U.S. PATENT DOCUMENTS

2008/0071454 A1* 3/2008 Shiraki ................... B60T 7/122
                                                    188/162
2019/0077385 A1* 3/2019 Okano ....................... B60T 8/00

FOREIGN PATENT DOCUMENTS

DE          10150803 A1    5/2003
JP       2008068839 A  *  3/2008
(Continued)

OTHER PUBLICATIONS

International Search Report (PCT/ISA/210) with translation and Written Opinion (PCT/ISA/237) mailed on Jul. 7, 2020, by the Japanese Patent Office as the International Searching Authority for International Application No. PCT/JP2020/020098.

*Primary Examiner* — Melody M Burch
(74) *Attorney, Agent, or Firm* — BUCHANAN INGERSOLL & ROONEY PC (57) ABSTRACT

A brake control device includes a control unit configured to calculate a target current value, which is a target current value to the motor, based on master cylinder hydraulic pressure, and reduce an energization level to the motor when an actual current value, which is an actual current value to the motor, reaches the target current value, set a hydraulic pressure threshold value, which is a threshold value of the master cylinder hydraulic pressure corresponding to a braking force necessary for the vehicle to stop based on an inclination angle of a road on which the vehicle is stopped, and calculate a time change amount of the master cylinder hydraulic pressure, and in a case where the time change amount exceeds a predetermined change amount, increase an energization level to the motor when the master cylinder hydraulic pressure subsequently becomes less than or equal to the hydraulic pressure threshold value.

3 Claims, 8 Drawing Sheets

(51) Int. Cl.
  *B60T 7/04*      (2006.01)
  *B60T 13/66*     (2006.01)
  *B60T 13/68*     (2006.01)
  *F16D 65/18*     (2006.01)
  *F16D 121/02*    (2012.01)
  *F16D 121/24*    (2012.01)
  *F16D 125/40*    (2012.01)
  *F16D 125/48*    (2012.01)

(52) U.S. Cl.
  CPC ........... *B60T 13/686* (2013.01); *B60T 13/745* (2013.01); *B60T 2201/06* (2013.01); *F16D 65/18* (2013.01); *F16D 2121/02* (2013.01); *F16D 2121/24* (2013.01); *F16D 2125/40* (2013.01); *F16D 2125/48* (2013.01)

(56) References Cited

FOREIGN PATENT DOCUMENTS

| | | | | |
|---|---|---|---|---|
| JP | 4265634 B2 | * | 5/2009 | ................ B60L 7/24 |
| KR | 20100068272 A | * | 6/2010 | |

\* cited by examiner

BRAKE CONTROL DEVICE

TECHNICAL FIELD

The present disclosure relates to a brake control device.

BACKGROUND ART

In recent years, in vehicles such as passenger cars, a brake device using a hydraulic brake device that generates hydraulic braking force and an electric brake device (electric parking brake (EPB)) that generates electric braking force in combination has been widely adopted. In this brake device, for example, a braking member is pressed by hydraulic pressure toward a member-to-be-braked that rotates integrally with a wheel of a vehicle to generate hydraulic braking force, and the braking member is pressed toward the member-to-be-braked by driving a motor to generate electric braking force. In this case, a braking force obtained by summing the hydraulic braking force and the electric braking force is generated.

Therefore, for example, if the target braking force is to be generated by the electric braking force independently of the hydraulic braking force when the hydraulic braking force is generated, an excessive braking force is generated. Therefore, there is a conventional technique in which the generated hydraulic braking force is estimated based on the hydraulic pressure of the master cylinder, and an amount obtained by subtracting the estimated hydraulic braking force from the target braking force is generated by the electric braking force.

CITATIONS LIST

Patent Literature

Patent Literature 1: German Patent Application Publication No. 10150803

SUMMARY

Technical Problems

However, in the case of the above-described conventional technique, for example, in a state where the hydraulic pressure of the master cylinder has not sufficiently reached the wheel cylinder due to sudden brake operation (sudden stepping) or the like by the driver (driver), the estimated hydraulic braking force is smaller than the actually generated hydraulic braking force. In this case, the sum of the estimated hydraulic braking force and the electric braking force becomes smaller than the target braking force. Then, for example, there is a problem that a situation in which the braking force necessary for stopping the vehicle on the slope cannot be realized occurs.

Therefore, an object of the present disclosure is to provide a brake control device capable of realizing the necessary braking force even when the hydraulic pressure of the master cylinder does not sufficiently reach the wheel cylinder due to sudden brake operation or the like by a driver in a brake device that uses both a hydraulic brake device and an electric brake device.

Solutions to Problems

A brake control device according to the present disclosure relates to a brake control device applied to a vehicle including a hydraulic brake device that presses a braking member by hydraulic pressure toward a member-to-be-braked that rotates integrally with a wheel of a vehicle to generate hydraulic braking force, and an electric brake device that presses the braking member toward the member-to-be-braked by driving a motor to generate an electric braking force, the brake control device including a control unit configured to calculate a target current value, which is a target value of current to the motor, based on hydraulic pressure of a master cylinder, and reduce an energization level to the motor when an actual current value, which is an actual value of the current to the motor, reaches the target current value, set a hydraulic pressure threshold value, which is a threshold value of a hydraulic pressure of the master cylinder corresponding to a braking force necessary for the vehicle to stop based on an inclination angle of a road on which the vehicle is stopped, and calculate a time change amount of the hydraulic pressure of the master cylinder, and in a case where the time change amount exceeds a predetermined change amount, increase an energization level to the motor when the hydraulic pressure of the master cylinder subsequently becomes less than or equal to the hydraulic pressure threshold value.

DESCRIPTION OF EMBODIMENTS

Hereinafter, exemplary embodiments of the present disclosure (first embodiment, second embodiment) will be disclosed. The configurations of the embodiment shown below, and the operations and results (effects) provided by the configurations are merely examples. The present disclosure can also be realized with configurations other than the configurations disclosed in the following embodiments. Furthermore, according to the present disclosure, it is possible to obtain at least one of the various effects (including derivative effects) obtained by the following configuration.

Hereinafter, the first EPB operation may be referred to as a clamp, and the second EPB operation for the subsequent braking force adjustment may be referred to as a re-clamp. The first embodiment and the second embodiment are different in that the first embodiment performs the re-clamping after the clamping is completed, and the second embodiment starts the re-clamping after the clamping is forcibly terminated in the middle.

In a first embodiment and a second embodiment, a vehicle brake device in which a disc brake type EPB is applied to the rear wheel system will be described by way of an example.

First Embodiment

Figure 1:
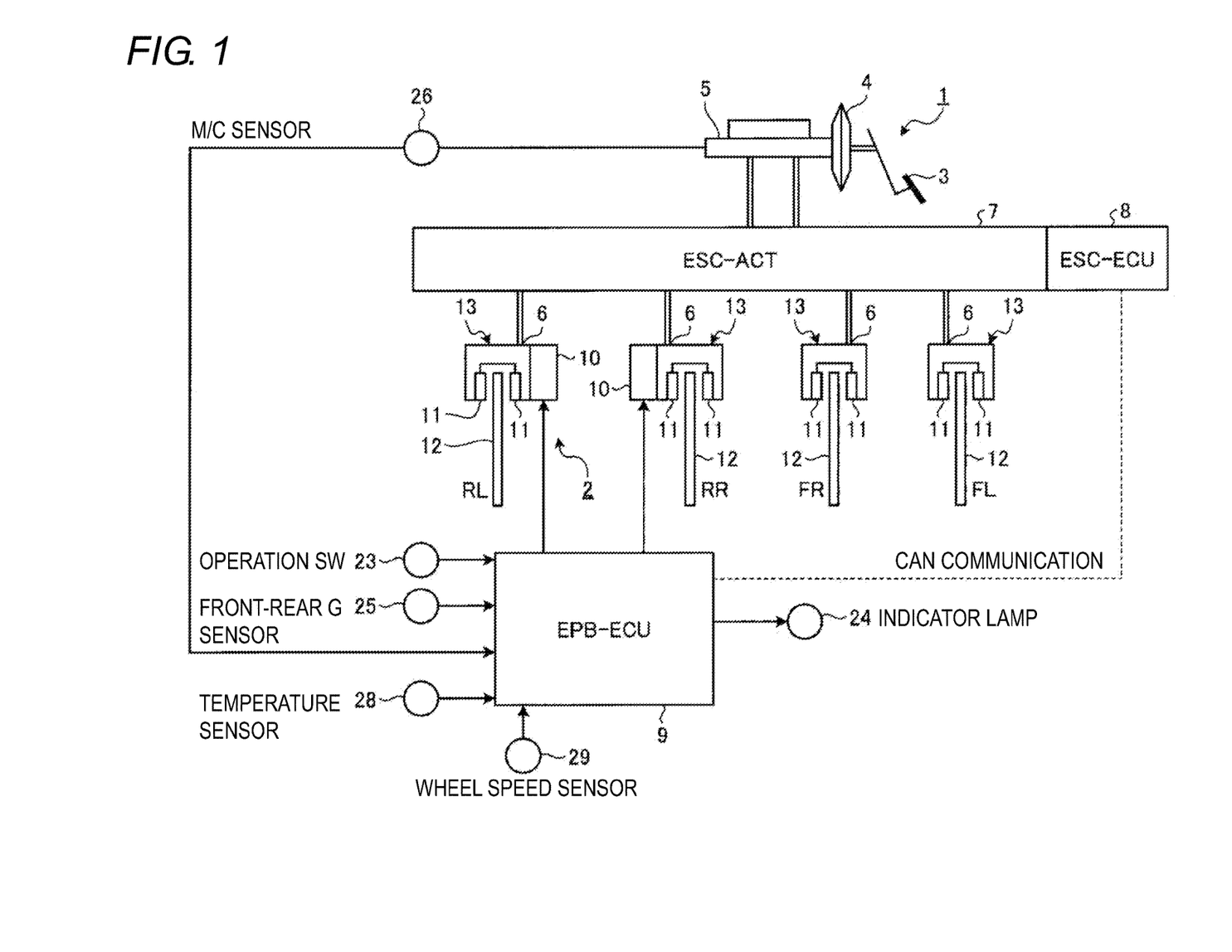
FIG. 1 is a schematic view illustrating an overall outline of a vehicle brake device according to a first embodiment.
Figure 2:
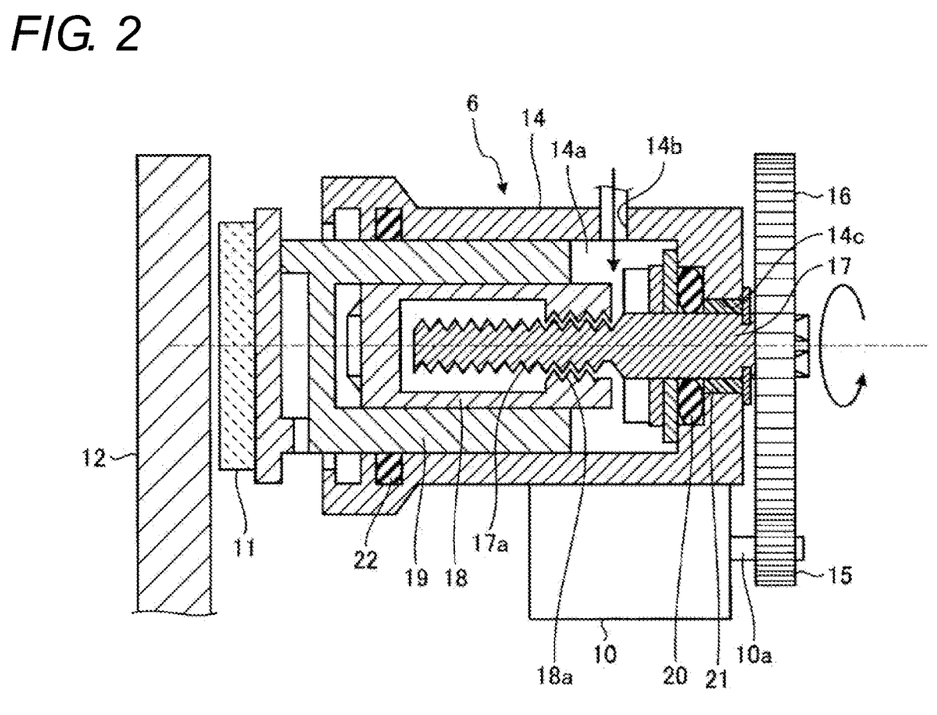
FIG. 2 is a schematic cross-sectional view of a wheel brake mechanism of a rear wheel system provided in the vehicle brake device of the first embodiment.

FIG. 1 is a schematic view showing an overall outline of a vehicle brake device according to a first embodiment. FIG. 2 is a schematic cross-sectional view of a wheel brake mechanism of the rear wheel system provided in the vehicle brake device of the first embodiment.

As shown in FIGS. 1 and 2, the vehicle brake device according to the first embodiment includes a service brake 1 (hydraulic brake device) that presses a brake pad 11 (braking member) by hydraulic pressure toward a brake disc (member-to-be-braked) that rotates integrally with a wheel of a vehicle to generate hydraulic braking force (service brake force), and an EPB 2 (electric brake device) that presses the brake pad 11 toward the brake disc 12 by driving an EPB motor 10 to generate electric braking force.

The service brake 1 is a hydraulic brake mechanism that generates brake hydraulic pressure based on the depression of the brake pedal 3 by the driver and generates service brake force based on this brake hydraulic pressure. Specifically, the service brake 1 boosts the pedaling force corresponding to the depression of the brake pedal 3 by the driver with a booster 4, and then generates a brake hydraulic pressure corresponding to the boosted pedaling force in a master cylinder (M/C) 5. Then, the brake hydraulic pressure is transmitted to a wheel cylinder (W/C) 6 provided in a wheel brake mechanism of each wheel to generate a service brake force. Furthermore, an actuator 7 for controlling brake hydraulic pressure is provided between the M/C 5 and the W/C 6. The actuator 7 adjusts the service brake force generated by the service brake 1 and performs various controls (e.g., anti-skid control etc.) for improving the safety of the vehicle.

Various controls using the actuator 7 are executed by an electronic stability control (ESC)-ECU 8 that controls the service brake force. For example, the ESC-ECU 8 outputs a control current for controlling various control valves provided in the actuator 7 and a motor for driving the pump to control the hydraulic circuit provided in the actuator 7, and control the W/C pressure transmitted to the W/C 6. Wheel slip is thereby avoided, and the safety of the vehicle is improved. For example, the actuator 7 is configured to include, for each wheel, a pressure increasing control valve that controls the application of the brake hydraulic pressure generated in the M/C 5 or the brake hydraulic pressure generated by the pump drive with respect to the W/C 6, a pressure reducing control valve that reduces the W/C pressure by supplying brake fluid in each W/C 6 to a reservoir, and the like, and can perform pressure increasing, maintaining, and reducing control of the W/C pressure. Furthermore, the actuator 7 can realize the automatic pressurizing function of the service brake 1, and can automatically pressurize the W/C 6 even in a state where there is no brake operation based on the control of the pump drive and various control valves.

The EPB 2 generates an electric braking force by driving the wheel brake mechanism by the EPB motor 10, and is configured to include an EPB-ECU 9 (control unit) that controls the drive of the EPB motor 10. The EPB-ECU 9 and the ESC-ECU 8 transmit and receive information by, for example, Controller Area Network (CAN) communication.

The wheel brake mechanism is a mechanical structure that generates a brake force (braking force) in the vehicle brake device of the first embodiment, and has a structure in which a wheel brake mechanism of the front wheel system first generates a service brake force by the operation of the service brake 1. On the other hand, the wheel brake mechanism of the rear wheel system has a shared structure that generates a brake force for both the operation of the service brake 1 and the operation of the EPB 2. The wheel brake mechanism of the front wheel system is a wheel brake mechanism that has been conventionally used in general, in which a mechanism for generating the electric braking force based on the operation of the EPB 2 is omitted, as opposed to the wheel brake mechanism of the rear wheel system, and thus the description thereof will be omitted here, and the wheel brake mechanism of the rear wheel system will be described below.

In the wheel brake mechanism of the rear wheel system, not only when the service brake 1 is operated but also when the EPB 2 is operated, the brake pad 11, which is the friction material shown in FIG. 2, is pressed to sandwich the brake disc 12 (12RL, 12RR, 12FR, 12FL) which is a friction object material by the brake pad 11, thus generating a frictional force between the brake pad 11 and the brake disc 12, and generating a brake force.

Specifically, the wheel brake mechanism rotates the EPB motor 10 directly fixed to the body 14 of the W/C 6 for pressing the brake pad 11 as shown in FIG. 2 in the caliper 13 shown in FIG. 1 to rotate a spur gear 15 provided on a drive shaft 10a of the EPB motor 10. Then, the brake pad 11 is moved by transmitting the rotational force (output) of the EPB motor 10 to a spur gear 16 engaged with the spur gear 15, and the electric braking force by the EPB 2 is generated.

In the caliper 13, in addition to the W/C 6 and the brake pad 11, a part of the end face of the brake disc 12 is accommodated so as to be sandwiched by the brake pad 11. The W/C 6 can generate the W/C pressure in a hollow portion 14a, which is the brake fluid accommodation chamber, by introducing the brake hydraulic pressure into the hollow portion 14a of the cylindrical body 14 through a passage 14b, and is configured to include a rotary shaft 17, a propulsion shaft 18, a piston 19, and the like in the hollow portion 14a.

The rotary shaft 17 has one end connected to the spur gear 16 through an insertion hole 14c formed in the body 14, so that when the spur gear 16 is turned, the rotary shaft 17 is turned with the turning of the spur gear 16. A male screw groove 17a is formed on the outer peripheral surface of the rotary shaft 17 at the end of the rotary shaft 17 opposite to the end coupled to the spur gear 16. On the other hand, the other end of the rotary shaft 17 is axially supported by being inserted into the insertion hole 14c. Specifically, the insertion hole 14c is provided with a bearing 21 together with an O-ring 20, so that the O-ring 20 prevents the brake fluid from leaking out between the rotary shaft 17 and the inner wall surface of the insertion hole 14c, and the bearing 21 axially supports the other end of the rotary shaft 17.

The propulsion shaft 18 is configured by a nut including a hollow tubular member, and has a female screw groove 18a to be screw fitted with the male screw groove 17a of the rotary shaft 17 formed on the inner wall surface. The propulsion shaft 18 is configured, for example, in a circular column shape or a polygonal column shape provided with a key for preventing rotation, so that even if the rotary shaft 17 is turned, it cannot be turned about the turning center of the rotary shaft 17. Therefore, when the rotary shaft 17 is turned, the rotational force of the rotary shaft 17 is converted to a force for moving the propulsion shaft 18 in the axial direction of the rotary shaft 17 by the engagement between the male screw groove 17a and the female screw groove 18a. When the drive of the EPB motor 10 is stopped, the propulsion shaft 18 stops at the same position due to the frictional force from the engagement between the male screw groove 17a and the female screw groove 18a, where if the drive of the EPB motor 10 is stopped when the target electric braking force is obtained, the propulsion shaft 18 can be held at that position, desired electric braking force can be maintained and self-locking (hereinafter simply referred to as "lock") can be performed.

The piston 19 is arranged so as to surround the outer periphery of the propulsion shaft 18, and is formed by a bottomed cylindrical member or a polygonal cylindrical member and arranged such that the outer peripheral surface comes into contact with the inner wall surface of the hollow portion 14a formed in the body 14. A structure is such that a seal member 22 is provided on the inner wall surface of the body 14 and W/C pressure can be applied to the end face of the piston 19 so that brake fluid does not leak out between the outer peripheral surface of the piston 19 and the inner wall surface of the body 14. The seal member 22 is used to generate a reaction force for returning the piston 19 at the time of release control after the lock control. Since the seal member 22 is provided, basically, even if the brake pad 11 and the piston 19 are pushed in within a range not exceeding the elastic deformation amount of the seal member 22 by the tilted brake disc 12 during turning, they are pushed back toward the brake disc 12 so that the gap between the brake disc 12 and the brake pad 11 is held at a predetermined clearance.

In addition, to prevent the piston 19 from turning about the turning center of the rotary shaft 17 even if the rotary shaft 17 rotates, when the propulsion shaft 18 is provided with a rotation prevention key, the piston is provided with a key groove in which the key slides, and when the propulsion shaft 18 has a polygonal column shape, the piston has a polygonal cylindrical shape corresponding thereto.

The brake pad 11 is arranged at the distal end of the piston 19, and the brake pad 11 is moved in the left-right direction in the plane of drawing accompanying the movement of the piston 19. Specifically, the piston 19 is movable in the left direction in the plane of drawing accompanying the movement of the propulsion shaft 18, and is movable in the left direction in the plane of drawing independently from the propulsion shaft 18 when the W/C pressure is applied to the end of the piston 19 (the end opposite to the end where the brake pad 11 is arranged). Then, if the brake hydraulic pressure in the hollow portion 14a is not applied (W/C pressure=0) when the propulsion shaft 18 is at the release position (the state before the EPB motor 10 is rotated), which is the standby position in the normal release, the piston 19 is moved in the right direction in the plane of drawing by the elastic force of the seal member 22 to be described later, and the brake pad 11 can be separated away from the brake disc 12. Furthermore, when the EPB motor 10 is rotated and the propulsion shaft 18 is moved in the left direction in the plane of drawing from the initial position, even if the W/C pressure becomes 0, the movement of the piston 19 in the right direction in the plane of drawing is regulated by the moved propulsion shaft 18 and the brake pad 11 is held in place.

In the wheel brake mechanism configured as described above, when the service brake 1 is operated, the piston 19 is moved in the left direction in the plane of drawing based on the W/C pressure generated thereby so that the brake pad 11 is pressed against the brake disc 12 and the service brake force is generated. Furthermore, when the EPB 2 is operated, the spur gear 15 is rotated by driving the EPB motor 10, and the spur gear 16 and the rotary shaft 17 are accordingly rotated, so that the propulsion shaft 18 is moved toward the brake disc 12 (left direction in the plane of drawing) based on the engagement between the male screw groove 17a and the female screw groove 18a. The distal end of the propulsion shaft 18 thereby abuts the bottom surface of the piston 19 and presses the piston 19, whereby the piston 19 is also moved in the same direction, so that the brake pad 11 is pressed against the brake disc 12 and an electric braking force is generated. Therefore, a shared wheel brake mechanism that generates a brake force for both the operation of the service brake 1 and the operation of the EPB 2 can be adopted.

Furthermore, it is possible to confirm the generation state of the electric braking force by the EPB2 or recognize the current detection value by confirming the current detection value of the current sensor (not shown) for detecting the current of the EPB motor 10.

A front-rear G sensor 25 detects G (acceleration) in the front-rear direction (advancing direction) of the vehicle and transmits a detection signal to the EPB-ECU 9.

An M/C pressure sensor 26 detects the M/C pressure in the M/C 5 and transmits a detection signal to the EPB-ECU 9.

A temperature sensor 28 detects the temperature of the wheel brake mechanism (e.g., a brake disc) and transmits a detection signal to the EPB-ECU 9.

A wheel speed sensor 29 detects the rotation speed of each wheel and transmits a detection signal to the EPB-ECU 9. Although one wheel speed sensor 29 is actually provided for each wheel, detailed illustration and description thereof will be omitted here.

The EPB-ECU 9 is configured by a well-known microcomputer equipped with CPU (Central Processing Unit), ROM (Read Only Memory), RAM (Random Access Memory), I/O, and the like, and performs parking brake control by controlling the rotation of the EPB motor 10 following the program stored in the ROM and the like.

The EPB-ECU 9 inputs, for example, a signal corresponding to the operation state of an operation switch (SW) 23 provided on an instrumental panel (not shown) in the vehicle compartment, and drives the EPB motor 10 according to the operation state of the operation SW 23. Furthermore, the EPB-ECU 9 executes lock control, release control, and the like based on the current detection value of the EPB motor 10, and recognizes that the lock control is being performed based on the control state or that the wheel is in the lock state by the lock control, and that the release control is being performed or that the wheel is in the release state (EPB release state) by the release control. Then, the EPB-ECU 9 outputs a signal for performing various displays to an indicator lamp 24 provided on the instrumental panel.

The vehicle brake device configured as described above basically performs an operation of generating a braking force in the vehicle by generating the service brake force by the service brake 1 when the vehicle is traveling. Furthermore, when the vehicle is stopped by the service brake 1, the driver performs operations such as pressing the operation SW 23 to operate the EPB 2 and generate the electric braking force thus maintaining the stop state, and releasing the electric braking force thereafter. That is, as the operation of the service brake 1, when the driver operates the brake pedal 3 while the vehicle is traveling, the brake hydraulic pressure generated in the M/C 5 is transmitted to the W/C 6 thus generating the service brake force. Moreover, as the operation of the EPB 2, the piston 19 is moved by driving the EPB motor 10, and the electric braking force is generated by pressing the brake pad 11 against the brake disc 12 to have the wheels in the lock state, or the electric braking force is released by separating the brake pad 11 from the brake disc 12 to have the wheels in the release state.

Specifically, the electric braking force is generated or released by the lock/release control. In the lock control, the EPB 2 is operated by forward rotating the EPB motor 10, the rotation of the EPB motor 10 is stopped at a position where a desired electric braking force can be generated by the EPB 2, and this state is maintained. A desired electric braking force is thereby generated. In the release control, the EPB 2 is operated by reverse rotating the EPB motor 10, and the electric braking force generated in the EPB 2 is released.

More specifically, the EPB-ECU 9 calculates a target current value which is a target value of the current to the EPB motor 10 based on the hydraulic pressure of the M/C 5, and reduces the energization level to the motor when the actual current value which is an actual value of the current to the EPB motor 10 reaches the target current value. When the hydraulic pressure of the M/C 5 is equal to the hydraulic pressure of the W/C 6, the target braking force can be realized by this control. However, with only this control, in a state where the hydraulic pressure of the M/C 5 does not sufficiently reach the M/C 5 due to sudden brake operation (sudden stepping) or the like by the driver, the realized braking force becomes smaller than the target braking force. Therefore, the following control is also performed.

The EPB-ECU 9 sets a hydraulic pressure threshold value, which is a threshold value of the hydraulic pressure of the M/C 5 corresponding to the braking force necessary for the vehicle to stop, based on the inclination angle of the road where the vehicle is stopped. Note that the inclination angle of the road can be recognized (calculated) on the basis of, for example, detection signals by the front-rear G sensor 25.

In addition, the EPB-ECU 9 calculates the time change amount of the hydraulic pressure of the M/C 5, and in a case where the time change amount exceeds a predetermined change amount (threshold value), increases the energization level to the EPB motor 10 (performs re-clamping) when the hydraulic pressure of the M/C 5 becomes less than or equal to the hydraulic pressure threshold value thereafter.

Note that, for example, the EPB-ECU 9 determines the hydraulic pressure threshold value based on the actual current value at the time point when the reduction in the energization level to the EPB motor 10 is started. For example, the EPB-ECU 9 sets the hydraulic pressure threshold value to be smaller as the actual current value at the time point when the reduction in the energization level to the EPB motor 10 is started is larger. Hereinafter, processing and the like of the EPB-ECU 9 will be described in detail with reference to FIG. 3 and subsequent drawings.

Here, meanings of main symbols used in the following description will be described. Pm is the hydraulic pressure of the M/C 5. Ia is an actual current value of the EPB motor 10. It is a target current value of the EPB motor 10. Ix is an actual current value (start actual current value) at the time point when the reduction in the energization level to the EPB motor 10 is started.

Zit is a calculation map of the target current value of the EPB motor 10. Ka is a road inclination angle. dP is a time change amount of the M/C hydraulic pressure Pm (differential value of Pm: hydraulic pressure gradient). px is a predetermined change amount (threshold value) with respect to the time change amount dP. Pz is a hydraulic pressure threshold value. Zpz is a calculation map of the hydraulic pressure threshold value Pz.

Figure 3:
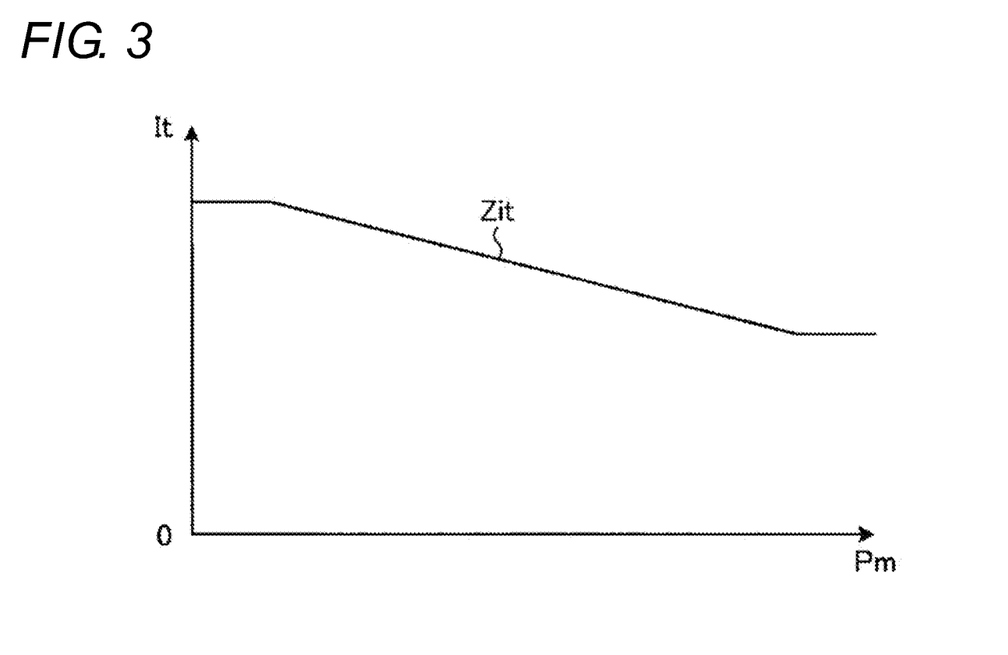
FIG. 3 is a graph illustrating a relationship between a master cylinder hydraulic pressure and a target current value in the first embodiment.

FIG. 3 is a graph illustrating a relationship (calculation map Zit) between the M/C hydraulic pressure Pm and the target current value It in the first embodiment. In the graph of FIG. 3, the vertical axis represents the target current value It, and the horizontal axis represents the M/C hydraulic pressure Pm. By using this calculation map Zit, the target current value It can be generally determined to be smaller as the M/C hydraulic pressure Pm is larger. This is because when the target braking force is the same, the electric braking force may be smaller as the hydraulic braking force is larger.

Figure 4:
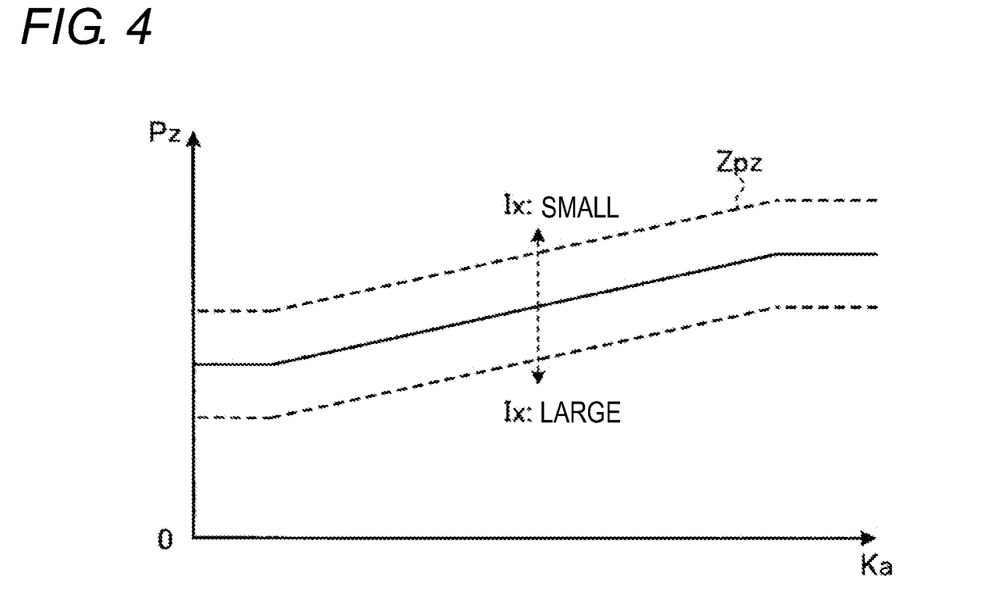
FIG. 4 is a graph illustrating a relationship between a road inclination angle and a hydraulic pressure threshold value in the first embodiment.

FIG. 4 is a graph illustrating a relationship (calculation map Zpz) between the road inclination angle Ka and the hydraulic pressure threshold value Pz in the first embodiment. In the graph of FIG. 4, the vertical axis represents the hydraulic pressure threshold value Pz, and the horizontal axis represents the road inclination angle Ka. In addition, the calculation map Zpz moves downward as the start actual current value Ix is larger, and moves upward as the start actual current value Ix is smaller.

By using this calculation map Zpz, the hydraulic pressure threshold value Pz can be generally determined to be larger as the road inclination angle Ka is larger. This is because the braking force required to maintain the stopped state of the vehicle is larger as the road inclination angle is larger.

By using the calculation map Zpz, the hydraulic pressure threshold value Pz can be determined to be smaller as the start actual current value Ix is larger. This is because as the start actual current value Ix is larger, the already realized electric braking force is larger and the hydraulic braking force required for maintaining the stopped state of the vehicle is smaller.

Figure 5A:
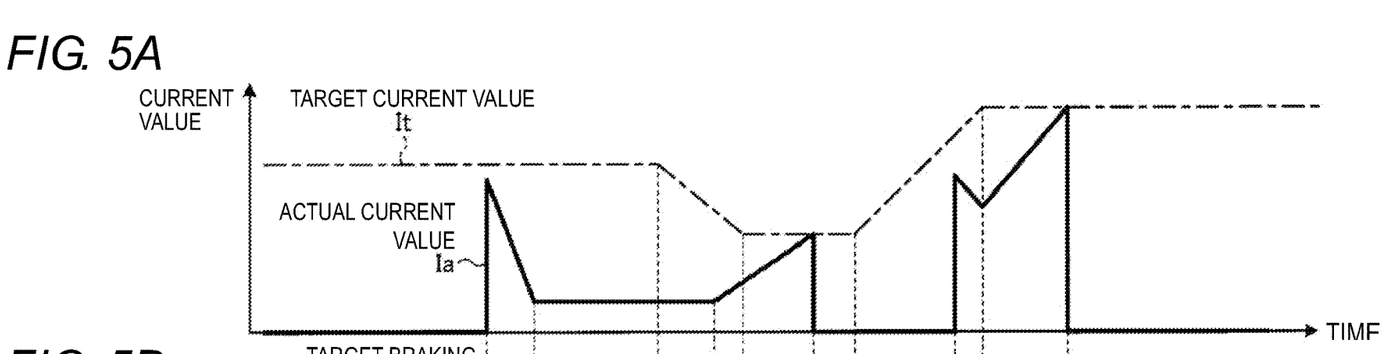
FIGS. 5A and 5B are timing charts illustrating an example of a temporal change of each value in the first embodiment.
Figure 5B:
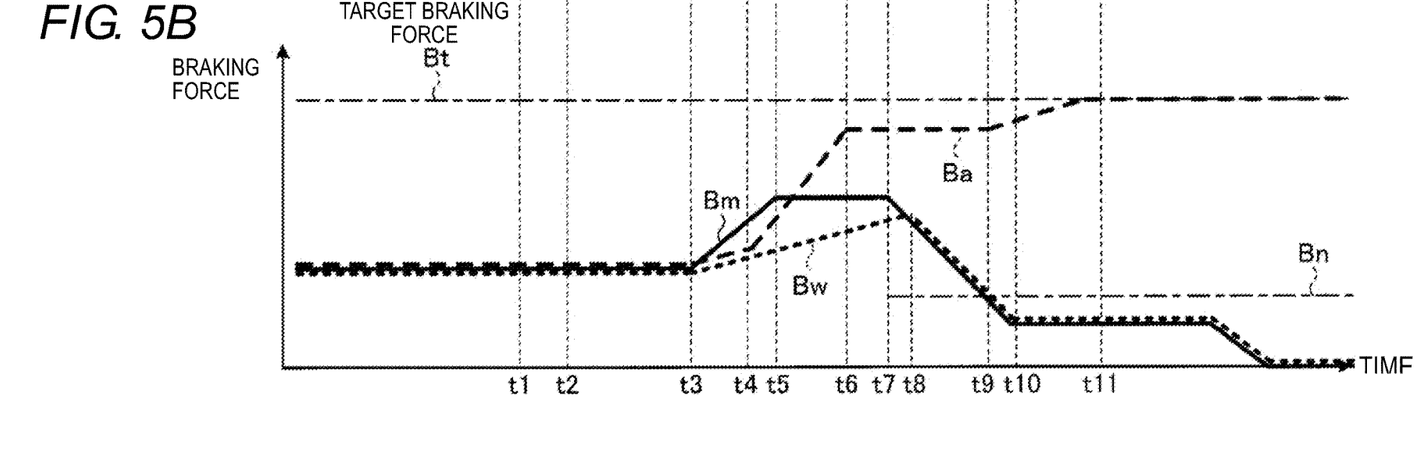

Next, an example of a temporal change in each value in the first embodiment will be described with reference to FIGS. 5A and 5B. FIGS. 5A and 5B are timing charts illustrating an example of a temporal change in each value in the first embodiment. In (a), the vertical axis represents a current value, and the horizontal axis represents time.

In (b), the vertical axis represents the braking force, and the horizontal axis represents time. Bt is the target braking force. Bm is a braking force conversion value of the M/C hydraulic pressure Pm. Bw is a braking force conversion value of the hydraulic pressure of the W/C 6. Ba is the sum of the W/C hydraulic braking force conversion value Bw and the electric braking force (total braking force). Bn is a braking force conversion value of the hydraulic pressure threshold value Pz.

When there is an operation request of the EPB 2 at time t1, the operation control of the EPB 2 is performed by the EPB-ECU 9, and the actual current value Ia rapidly increases due to the inrush current and then decreases thereafter and becomes a stable value at time t2. Thereafter, when the driver performs a sudden brake operation between times t3 and t5, the M/C hydraulic braking force conversion value Bm increases, and the target current value It decreases accordingly. After time t3, the W/C hydraulic braking force conversion value Bw also increases, but the increase is slower than the increase in the M/C hydraulic braking force conversion value Bm.

The actual current value Ia increases from time t4, reaches the target current value It at time t6, and becomes 0 when the operation of the EPB 2 ends. Although the target current value It decreased from time t3 to time t5, the total braking force Ba does not reach the target braking force Bt at the time point of time t6 since the W/C hydraulic braking force conversion value Bw is smaller than the M/C hydraulic braking force conversion value Bm.

After time t6, the M/C hydraulic braking force conversion value Bm decreases from time t7 and becomes equal to the W/C hydraulic braking force conversion value Bw at time t8. When the M/C hydraulic braking force conversion value Bm decreases from time t7, the EPB-ECU 9 then increases the target current value It by that amount. The target current value It starts to increase from time t7 and increases until time t10 at which the decrease of the M/C hydraulic braking force conversion value Bm stops.

When the M/C hydraulic braking force conversion value Bm decreases to the hydraulic pressure threshold value braking force conversion value Bn at time t9, the EPB 2 is driven by the EPB-ECU 9 to energize the EPB motor 10, and the actual current value Ia rapidly increases due to the inrush current, slightly decreases, and then increases until time t11. Then, the total braking force Ba starts to increase from time t9 and reaches the target braking force Bt at the time point of time t11.

Figure 6:
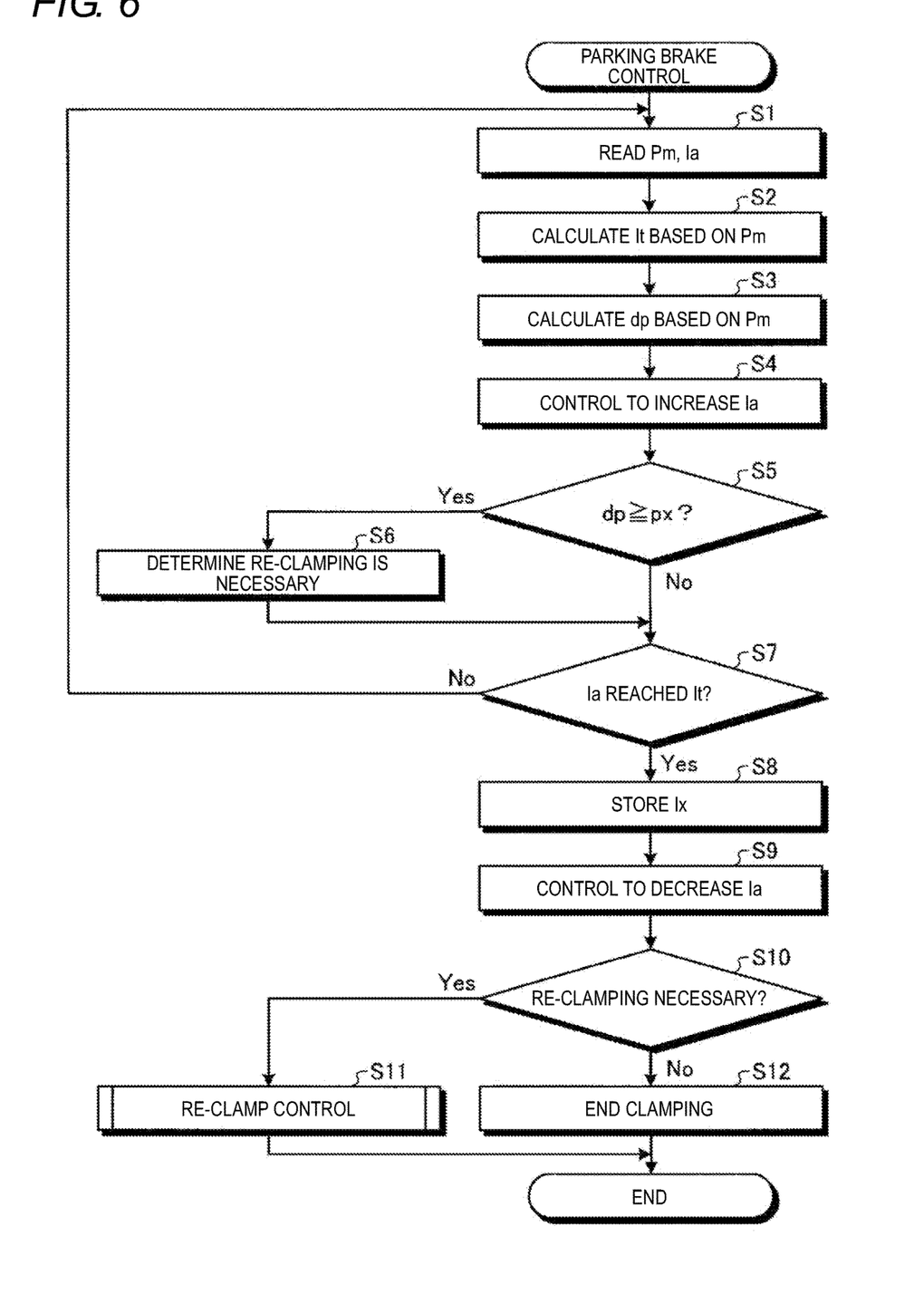
FIG. 6 is a flowchart illustrating a parking brake control process executed by the brake control device of the first embodiment.

Next, parking brake control process executed by the brake control device of the first embodiment will be described with reference to FIG. 6. FIG. 6 is a flowchart illustrating a parking brake control process executed by the brake control device of the first embodiment. It is assumed that there is an operation request of the EPB 2 at the start of the control of FIG. 6.

In step S1, the EPB-ECU 9 reads the M/C hydraulic pressure Pm and the actual current value Ia. Next, in step S2, the EPB-ECU 9 calculates a target current value It based on the M/C hydraulic pressure Pm (FIG. 3).

Next, in step S3, the EPB-ECU 9 calculates the M/C hydraulic pressure time change amount dp based on the M/C hydraulic pressure Pm. Next, in step S4, the EPB-ECU 9 controls the actual current value Ia to increase. That is, the energization level of the EPB 2 to the EPB motor 10 is increased.

Next, in step S5, the EPB-ECU 9 determines whether or not "M/C hydraulic pressure time change amount dp≥predetermined change amount px", and if Yes, the process proceeds to step S6, and if No, the process proceeds to step S7.

In step S6, the EPB-ECU 9 determines that re-clamping is necessary, and proceeds to step S7. In step S7, the EPB-ECU 9 determines whether or not the actual current value Ia has reached the target current value It, and if Yes, the process proceeds to step S8, and if No, the process returns to step S1.

In step S8, the EPB-ECU 9 stores the actual current value Ia at that time as the start actual current value Ix. Next, in step S9, the EPB-ECU 9 controls the actual current value Ia to decrease. That is, the energization level of the EPB 2 to the EPB motor 10 is reduced.

Next, in step S10, the EPB-ECU 9 determines whether or not re-clamping is necessary, and if Yes (in a case where the process has passed through step S6), the process proceeds to step S11, and if No (in a case where the process has not passed through step S6), the process proceeds to step S12. In step S12, the EPB-ECU 9 ends the clamping.

Figure 7:
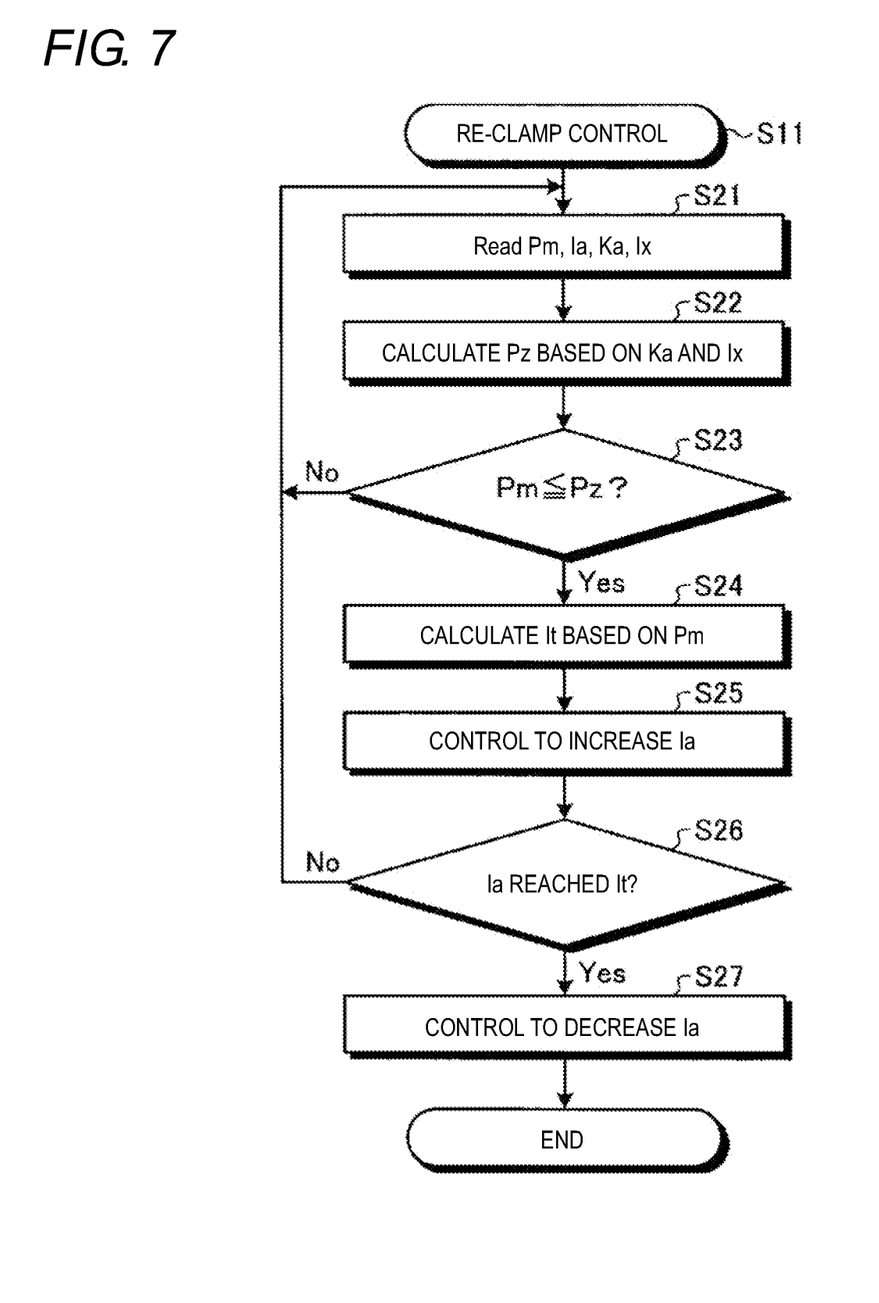
FIG. 7 is a flowchart illustrating a re-clamp control process executed by the brake control device of the first embodiment.

FIG. 7 is a flowchart illustrating the re-clamping control process (step S11 in FIG. 6) executed by the brake control device of the first embodiment. In step S21, the EPB-ECU 9 reads the M/C hydraulic pressure Pm, the actual current value Ia, the road inclination angle Ka, and the start actual current value Ix.

Next, in step S22, the EPB-ECU 9 calculates a hydraulic pressure threshold value Pz based on the road inclination angle Ka and the start actual current value Ix (FIG. 4).

Next, in step S23, the EPB-ECU 9 determines whether or not "M/C hydraulic pressure Pm≤hydraulic pressure threshold value Pz", and if Yes, the process proceeds to step S24, and if No, the process returns to step S21.

In step S24, the EPB-ECU 9 calculates a target current value It based on the M/C hydraulic pressure Pm (FIG. 3).

Next, in step S25, the EPB-ECU 9 controls the actual current value Ia to increase. That is, the energization level of the EPB 2 to the EPB motor 10 is increased.

Next, in step S26, the EPB-ECU 9 determines whether or not the actual current value Ia has reached the target current value It, and if Yes, the process proceeds to step S27, and if No, the process returns to step S21.

In step S27, the EPB-ECU 9 controls the actual current value Ia to decrease. That is, the energization level of the EPB 2 to the EPB motor 10 is reduced.

As described above, according to the brake control device of the first embodiment, the re-clamping is performed when the hydraulic pressure of the M/C 5 is suddenly increased (Yes in step S5 in FIG. 6), so that the necessary braking force can be realized even when the hydraulic pressure of the M/C 5 does not sufficiently reach the W/C 6 due to the sudden brake operation or the like by the driver.

Specifically, when the hydraulic pressure of the M/C 5 is suddenly increased, the re-clamping is performed after the condition of "M/C hydraulic pressure Pm hydraulic pressure threshold value Pz" is satisfied (after Yes in step S23 of FIG. 7) instead of the re-clamping being performed immediately after the end of the clamping, so that it is possible to realize an appropriate braking force without excess or deficiency by reliably equalizing the hydraulic pressure of the M/C 5 and the hydraulic pressure of the W/C 6 while preventing the vehicle from sliding down with the hydraulic braking force.

In addition, the hydraulic pressure threshold value Pz can be appropriately determined based on the actual current value (start actual current value Ix) at the time point when the reduction in the energization level to the EPB motor 10 is started (FIG. 4). Specifically, the hydraulic pressure threshold value Pz can be appropriately set to be smaller the larger the start actual current value Ix (FIG. 4).

On the other hand, for example, in the conventional technique, when the hydraulic braking force is generated, if the target braking force is to be generated by the electric braking force independently thereof, an excessive braking force is generated, and a situation in which an excessive hard load is applied to the caliper 13 occurs.

In addition, for example, in another conventional technique, if the generated hydraulic braking force is estimated based on the hydraulic pressure of the master cylinder, and an amount obtained by subtracting the estimated hydraulic braking force from the target braking force is to be generated by the electric braking force, a situation in which the necessary braking force cannot be realized occurs if there is a sudden brake operation (sudden stepping) or the like by the driver. Such a situation occurs particularly at a low temperature at which the brake fluid is less likely to flow.

According to the brake control device of the first embodiment, these situations can be avoided.

Second Embodiment

Next, a brake control device of a second embodiment will be described. The description on the matters same as in the first embodiment will be omitted as appropriate.

Figure 8A:
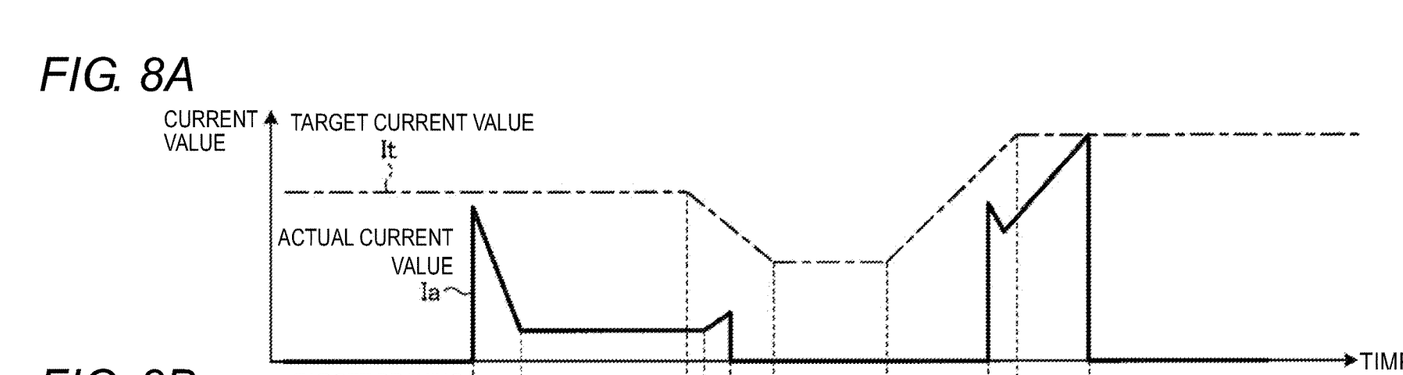
FIGS. 8A and 8B are timing charts illustrating an example of a temporal change of each value in a second embodiment.
Figure 8B:
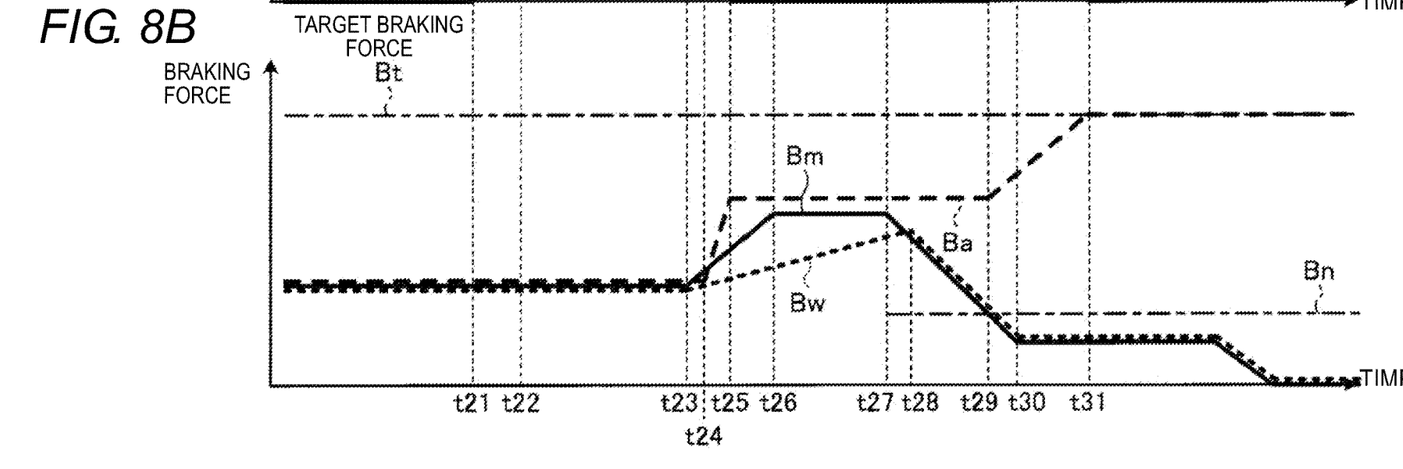

FIGS. 8A and 8B are timing charts illustrating an example of a temporal change in each value in the second embodiment. The description on the matters same as FIGS. 5A and 5B will be omitted as appropriate.

Time before time t23 is similar to time before time t3 in FIGS. 5A and 5B. The actual current value Ia rises from time t24 after time t23. Furthermore, when the driver performs a sudden brake operation between times t23 and t26, the M/C hydraulic braking force conversion value Bm increases, and the target current value It decreases accordingly. After time t23, the W/C hydraulic braking force conversion value Bw also increases, but the increase is slower than the increase in the M/C hydraulic braking force conversion value Bm.

At time t25, the EPB-ECU 9 determines that the time change amount of the hydraulic pressure of the M/C 5 has exceeded the predetermined change amount. Then, the EPB-ECU 9 forcibly ends the clamping, and the actual current value Ia becomes 0. Note that the total braking force Ba has not reached the target braking force Bt at the time point of time t26.

After time t26, the M/C hydraulic braking force conversion value Bm decreases from time t27 and becomes equal to the W/C hydraulic braking force conversion value Bw at time t28. Furthermore, as the M/C hydraulic braking force conversion value Bm decreases from time t27, the EPB-ECU 9 thereafter increases the target current value It accordingly. The target current value It starts to increase from time t27 and increases until time t30 at which the decrease of the M/C hydraulic braking force conversion value Bm stops.

When the M/C hydraulic braking force conversion value Bm decreases to the hydraulic pressure threshold value braking force conversion value Bn at time t29, the EPB 2 is driven by the EPB-ECU 9 to energize the EPB motor 10, and the actual current value Ia rapidly increases due to the inrush current, slightly decreases, and then increases until time t31. Then, the total braking force Ba starts to increase from time t29 and reaches the target braking force Bt at the time point of time t31.

Figure 9:
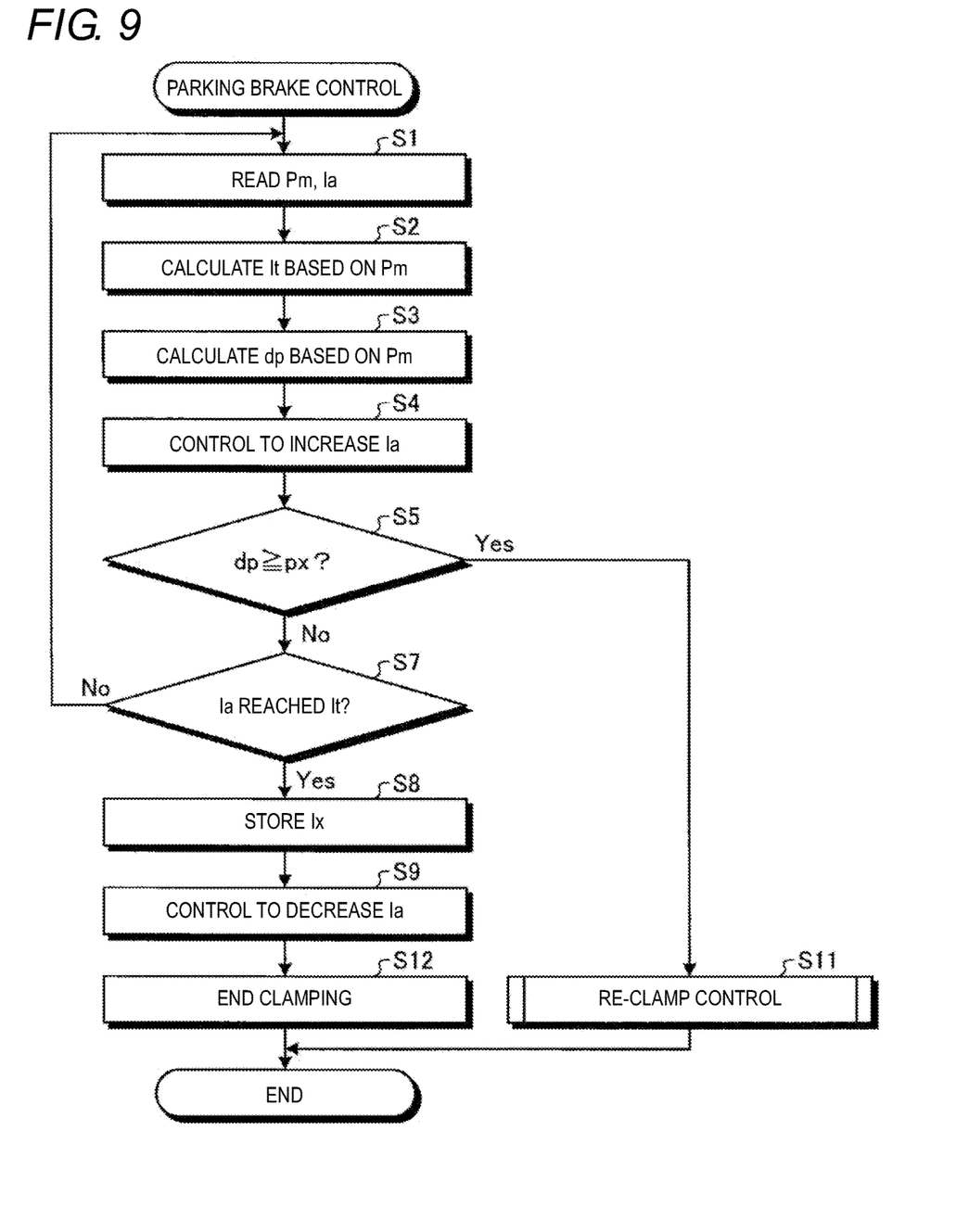
FIG. 9 is a flowchart illustrating a parking brake control process executed by the brake control device of the second embodiment.

Next, parking brake control process executed by the brake control device of the second embodiment will be described with reference to FIG. 9. FIG. 9 is a flowchart illustrating a parking brake control process executed by the brake control device of the second embodiment. It is assumed that there is an operation request of the EPB 2 at the start of the control of FIG. 9.

Steps S1 to S4 are similar to those in FIG. 6. Next, in step S5, the EPB-ECU 9 determines whether or not "M/C hydraulic pressure time change amount dp predetermined change amount px", and if Yes, the process proceeds to step S11, and if No, the process proceeds to step S7.

Steps S7 to S9 are similar to those in FIG. 6. After step S9, the process proceeds to step S12. Furthermore, details of step S11 are similar to those in FIG. 7.

As described above, according to the brake control device of the second embodiment, even when the clamping is forcibly ended in a case where the hydraulic pressure of the M/C 5 is suddenly increased, an effect of realizing the necessary braking force can be obtained by performing the re-clamping thereafter, similarly to the case of the first embodiment.

The embodiments and modified examples of the present disclosure have been described above, but the above-described embodiments and modified examples are merely examples, and they are not intended to limit the scope of the disclosure. The novel embodiments and modified examples described above can be implemented in various forms, and various omissions, substitutions, or modifications can be made without departing from the gist of the disclosure. Furthermore, the embodiments and modified examples described above are included in the scope and gist of the disclosure, and are included in the disclosure described in the Claims and the equivalent scope thereof.

For example, in the embodiments described above, the rear wheels are electric braking wheels, but this is not the sole case, and the front wheels may be electric braking wheels.

In addition, instead of determining whether or not "M/C hydraulic pressure Pm hydraulic pressure threshold value Pz" in step S23 of FIG. 7, whether or not a predetermined time (preset) in which the deviation is considered to be eliminated when the driver suddenly performs the brake operation and the hydraulic pressure of the M/C 5 and the hydraulic pressure of the W/C 6 are deviated has elapsed may be determined.

The invention claimed is:

1. A brake control device applied to a vehicle including,
a hydraulic brake device that presses a braking member by hydraulic pressure toward a member-to-be-braked that rotates integrally with a wheel of a vehicle to generate hydraulic braking force, and
an electric brake device that presses the braking member toward the member-to-be-braked by driving a motor to generate an electric braking force,
the brake control device comprising a control unit configured to,
calculate a target current value, which is a target value of current to the motor, based on hydraulic pressure of a master cylinder, and reduce an energization level to the motor when an actual current value, which is an actual value of the current to the motor, reaches the target current value,
set a hydraulic pressure threshold value, which is a threshold value of a hydraulic pressure of the master cylinder corresponding to a braking force necessary for the vehicle to stop based on an inclination angle of a road on which the vehicle is stopped, and
calculate a time change amount of the hydraulic pressure of the master cylinder, and in a case where the time change amount exceeds a predetermined change amount, increase an energization level to the motor when the hydraulic pressure of the master cylinder subsequently becomes less than or equal to the hydraulic pressure threshold value.

2. The brake control device according to claim 1, wherein the control unit determines the hydraulic pressure threshold value based on the actual current value at a time point when reduction in an energization level to the motor is started.

3. The brake control device according to claim 2, wherein the control unit sets the hydraulic pressure threshold value to be smaller the larger the actual current value at a time point when reduction in an energization level to the motor is started.

* * * * *